United States Patent
Dimou et al.

(10) Patent No.: US 12,369,091 B2
(45) Date of Patent: Jul. 22, 2025

(54) AUTONOMOUS WIRELESS DEVICE HANDOVER

(71) Applicant: QUALCOMM Incorporated, San Diego, CA (US)

(72) Inventors: Konstantinos Dimou, New York, NY (US); Yan Zhou, San Diego, CA (US); Junyi Li, Fairless Hills, PA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/001,602

(22) PCT Filed: Aug. 12, 2021

(86) PCT No.: PCT/US2021/045658
§ 371 (c)(1),
(2) Date: Dec. 13, 2022

(87) PCT Pub. No.: WO2022/040001
PCT Pub. Date: Feb. 24, 2022

(65) Prior Publication Data
US 2023/0232303 A1    Jul. 20, 2023

(30) Foreign Application Priority Data
Aug. 17, 2020    (GR) ............................... 20200100483

(51) Int. Cl.
*H04W 36/30* (2009.01)
*H04W 36/00* (2009.01)
(Continued)

(52) U.S. Cl.
CPC ... *H04W 36/305* (2018.08); *H04W 36/00837* (2018.08); *H04W 36/249* (2023.05); *H04W 36/362* (2023.05)

(58) Field of Classification Search
CPC ......... H04W 36/305; H04W 36/00837; H04W 36/249; H04W 36/362; H04B 7/0404; H04B 7/0695; H04B 7/088
See application file for complete search history.

(56) References Cited

U.S. PATENT DOCUMENTS

2015/0271861 A1    9/2015  Li et al.
2023/0232329 A1*   7/2023  Chen .................... H04W 24/10
                                                              455/572

FOREIGN PATENT DOCUMENTS

| EP | 3609231 A1 | 2/2020 |
| WO | 2016128277 A1 | 8/2016 |
| WO | 2019032882 A1 | 2/2019 |

OTHER PUBLICATIONS

International Search Report and Written Opinion—PCT/US2021/045658—ISA/EPO—Nov. 23, 2021.

(Continued)

*Primary Examiner* — Hashim S Bhatti
(74) *Attorney, Agent, or Firm* — Dinsmore & Shohl LLP—Qualcomm

(57) ABSTRACT

Embodiments include systems and methods that may be performed by a processor of a wireless device for managing a communication link with a communication network. Various embodiments may include determining whether a cause of a detected physical downlink shared channel (PDSCH) error in a downlink communication from a base station is an out of coverage condition, and initiating an autonomous handover from the base station to a second base station in (Continued)

response to determining that the cause of the PDSCH error is an out of coverage condition.

30 Claims, 8 Drawing Sheets

(51) Int. Cl.
*H04W 36/24* (2009.01)
*H04W 36/36* (2009.01)

(56) References Cited

OTHER PUBLICATIONS

Samsung, et al., "The Necessity of T312 in NR", 3GPP Draft, R2-1815359, 3GPP TSG-RAN WG2 #103bis, Discussion on Reuse of T312, 3rd Generation Partnership Project (3GPP), Mobile Competence Centre, 650, Route Des Lucioles, F-06921 Sophia-Antipolis Cedex, France, vol. RAN WG2. No. Chengdu. China, Oct. 8, 2018-Oct. 12, 2018, Sep. 28, 2018 (Sep. 28, 2018), 17 Pages, XP051524710, p. 1 p. 3.

* cited by examiner (1)

AUTONOMOUS WIRELESS DEVICE HANDOVER

RELATED APPLICATIONS

This application is a national stage application of and claims priority to PCT Application No. PCT/US2021/045658 entitled "Autonomous Wireless Device Handover" filed Aug. 12, 2021, which claims priority to Greek Patent Application No. 20200100483 entitled "Autonomous Wireless Device Handover" filed Aug. 17, 2020, the entire contents of both of which are hereby incorporated by reference for all purposes.

BACKGROUND

Wireless devices and base stations typically exchange information to improve and maintain a communication link. For example, wireless devices provide base stations with information about signal quality and signal strength, and base stations and wireless devices exchange information to adjust aspects of the communication link, such as transmit power, frequency band selection, modulation and coding scheme, beam selection, and so forth. In some cases, the base station and the wireless device may determine that the best course of action is to perform a handover of the wireless device to another base station. If a wireless device loses its communication link with a base station, the exchange of information is unavailable to the wireless device. The wireless device may then waste power and time attempting to reconnect with the base station, or attempting in vain to communicate control or data signaling with the base station.

SUMMARY

Various aspects include systems and methods of wireless communications performed by a processor of a wireless device for managing a communication link with a communication network. Various aspects may include determining whether a cause of a detected physical downlink shared channel (PDSCH) error in a downlink communication from a base station is an out of coverage condition, and initiating an autonomous handover from the base station to a second base station in response to determining that the cause of the PDSCH error is an out of coverage condition.

In some aspects, initiating an autonomous handover from the base station to a second base station in response to determining that the cause of the PDSCH error is an out of coverage condition may include determining whether the wireless device is configured to perform multi-slot beam sweeping on an uplink channel, and initiating the autonomous handover from the base station to the second base station in response to determining that the wireless device is not configured to perform multi-slot beam sweeping on the uplink channel. In some aspects, determining whether the wireless device is configured to perform multi-slot beam sweeping on the uplink channel may include determining whether the wireless device has received an indication that one or more uplink beams have been activated for the wireless device. In some aspects, determining whether the wireless device is configured to perform multi-slot beam sweeping on the uplink channel may include determining whether the wireless device has received a precoding matrix from the base station for one or more uplink beams. Some aspects may include determining whether a Time To Trigger timer exceeds a Time To Trigger threshold in response to determining that a measurement report trigger condition is met, and initiating the autonomous handover from the base station to the second base station in response to determining that the Time To Trigger timer exceeds the Time To Trigger threshold.

In some aspects, initiating an autonomous handover from the base station to a second base station in response to determining that the cause of the PDSCH error is an out of coverage condition may include sending to the second base station an indication that the cause of the PDSCH error is the out of coverage condition. Some aspects may include receiving from the base station a control signal that configures the wireless device to perform the autonomous handover in the out of coverage condition. In some aspects, initiating an autonomous handover from the base station to a second base station in response to determining that the cause of the PDSCH error is an out of coverage condition may include sending an initial access signal to the second base station.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
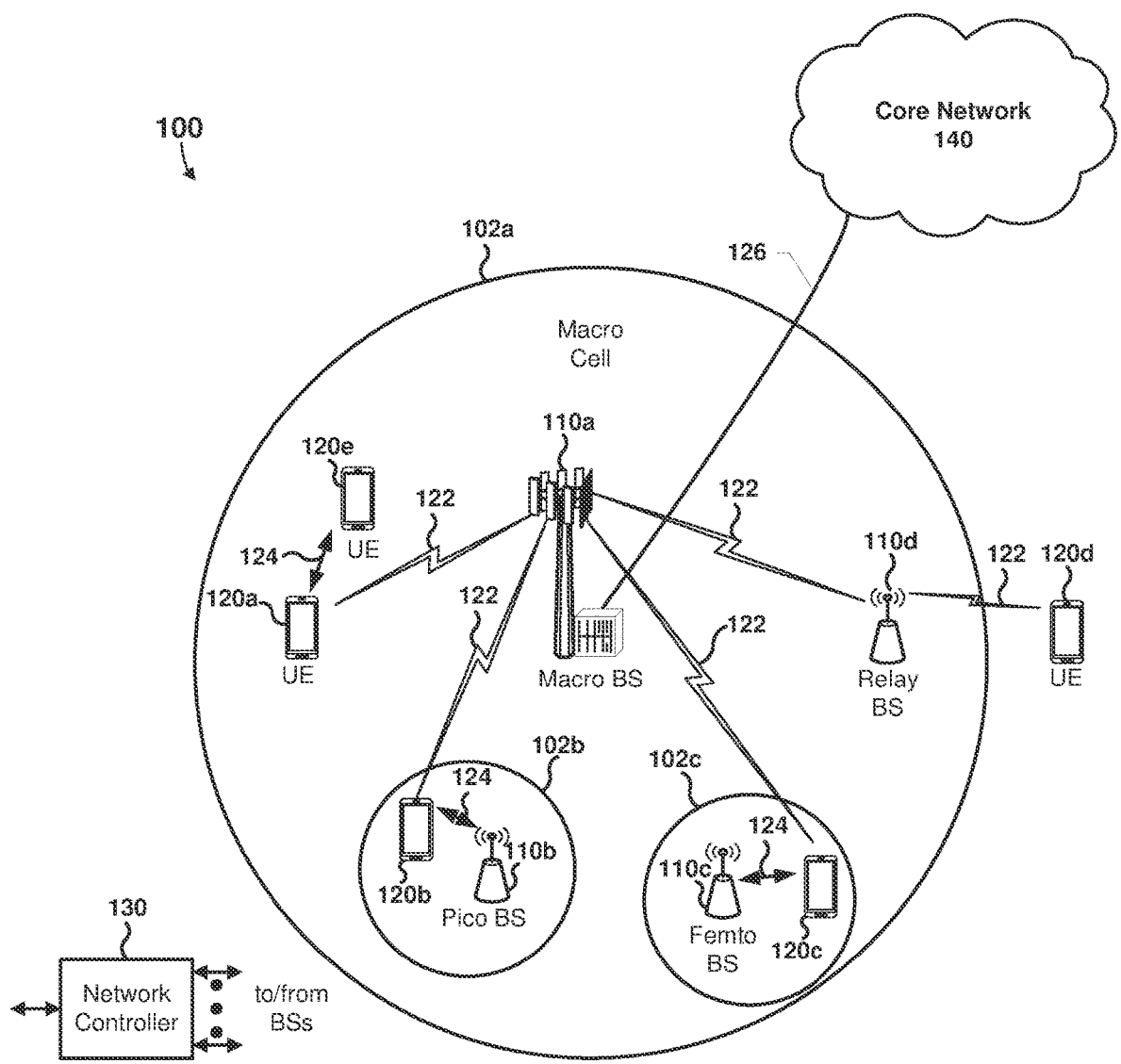
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for managing a communication link with a communication network. Various embodiments may improve the efficiency and accuracy of wireless communications between a wireless device and a communication network by improving the capability of a wireless device to respond to radio link failure, beam failure, and other network signal degradation or loss conditions.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

As used herein, the term "beam" refers to a signal formed by a transmitting device through the use of a beamforming or beam steering technique applied via a combination of physical equipment and signal processing variously referred to as a beamforming function. Beam reception by a receiving device may involve configuring physical equipment and signal processing of the receiving device to receive signals transmitted in a beam by the transmitting device. In some situations, beam reception by a receiving device also may involve configuring physical equipment and signal processing of the receiving device via a mapping function or a spatial filter so as to preferentially receive signals (e.g., with enhanced gain) from a particular direction (e.g., in a direction aligned with a transmitting device).

The term "beamforming" is used herein to refer to antenna array design and signal processing techniques used for directional signal communications and/or to achieve spatial selectivity (i.e., special filtering) of radio frequency (RF) signal reception. Beamforming on the transmitter end of communications may be accomplished by selective delaying (known as "phase shifting") of signals coupled to different elements in an antenna array so that RF signals emitted by the antenna array at a particular angle (relative to the antenna array) are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two axes (i.e., azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Next generation communication systems (such as 5G systems) impose minimum requirements on communication links, including hard latency constraints to provide services and functions such as ultra-reliable low latency communication (URLLC). Maintaining network connectivity is vital for satisfying these requirements. Wireless devices and base stations typically exchange information to improve and maintain a communication link. For example, a wireless device may provide a base station with information about signal quality and signal strength, and the base station and the wireless device may exchange information to adjust aspects of the communication link, such as transmit power, frequency band selection, modulation and coding scheme, beam selection, and so forth. If the wireless device loses the communication link with the base station, this exchange of information is unavailable to the wireless device, and the wireless device may then waste power and time attempting to reconnect with the base station, or attempting in vain to communicate control or data signaling with the base station. Further, the wireless device and the base station rely on such messaging to reach consensus that the wireless device should be handed over to a neighbor base station or cell.

Various embodiments include methods that enable a wireless device to autonomously manage degradation or failure of a communication link with a base station in a communication network. Various embodiments enable the wireless device to determine when an error in communication with a base station has occurred, and autonomously perform a handover to establish a communication link with a second base station in response to determining that the communication error has occurred. Some embodiments may include detecting that a physical downlink shared channel (PDSCH) error has occurred in a downlink communication from a base station, determining whether a cause of the PDSCH error is an out of coverage condition, and initiating an autonomous handover from the base station to a second base station in response to determining that the cause of the PDSCH error is an out of coverage condition. In some embodiments, the wireless device may determine the PDSCH error in response to determining that the wireless device is unable to successfully decode a downlink signal, such as data received in the downlink from the base station. Examples of an "out of coverage condition" include the wireless device being in a "coverage hole," the wireless device determining that a signal from the base station is substantially degraded or blocked, the wireless device determining that communication of control signaling and/or data signaling with the base station is substantially degraded or blocked, or another similar state or status. Under such conditions, the wireless device may be unable to receive control signals or other instructions from, or send communication link condition reports or control signals to, the base station. Various embodiments enable a wireless device to determine that appropriate conditions exist for a handover of the wireless device to a new base station, and to perform operations to initiate the handover, without control signals or other instructions from the current (e.g., serving) base station. Such operations to initiate a handover without control signals from the serving base station are referred to herein as initiating or performing an "autonomous handover."

In some embodiments, the wireless device may perform an autonomous handover in response to determining that a mechanism for improving the communication link with the base station is not available. Some embodiments may include determining whether the wireless device is configured to perform multi-slot physical uplink control channel (PUCCH) uplink beam sweeping or physical uplink shared channel (PUSCH) (e.g., if PUSCH uplink beam sweeping is available), and initiating by the wireless device the autonomous handover from the base station to the second base station in response to determining that the wireless device is not configured to perform multi-slot PUCCH (or PUSCH) uplink beam sweeping. In some embodiments, various Uplink Control Information (UCI), such as Hybrid Automatic Repeat Request (HARQ) acknowledgement (ACK) and non-acknowledgment (NACK) messages, Channel State Indication (CSI) measurement reports, Scheduling Requests (SR), may be transmitted via the PUCCH or PUSCH. In the descriptions of various embodiments and examples, references to transmitting UCI via the PUCCH are not meant to be exclusive and the UCI may also be transmitted via the PUSCH. As used herein, the term "uplink channel" includes the PUCCH and the PUSCH. In some embodiments, if the wireless device has data to be transmitted to the base station, then the base station may activate the PUSCH to enable the wireless device to transmit uplink data and uplink control via the PUSCH. In the absence of uplink data traffic to be transmitted, the wireless device may transmit uplink physical layer control information via the PUCCH.

In some embodiments, the wireless device may initiate the autonomous handover based on other determinations about the communication link with the base station. For example, the wireless device may monitor aspects of the communication link with the base station, such a Reference Signal Received Power (RSRP)), Reference Signal Received Quality (RSRQ), Signal-plus-Interference to Noise Ratio (SINR), and the like, as well as similar aspects of a signal from a nearby base station (or cell), such as a neighboring (second) base station. In some embodiments, the wireless device may compare one or more aspects of the communication link with the base station to one or more aspects of the signal from the neighboring (second) base station. In response to determining that the comparison of the one or more aspects meet an inequality threshold, the wireless device may determine that a measurement report trigger is met. Examples of measurement report triggers include various "Events," which are designated A1, A2, A3, A4, A5, A6, B1, and B2 in relevant 3GPP (Third Generation Partnership Project) technical standards. Each Event is associated with one or more inequalities of measurements of communication link or signal aspects. When a wireless device determines that an Event inequality is met, the wireless device may determine that a measurement report trigger condition is met. For example, an Event A3 measurement report is triggered when a signal strength of a neighbor cell's signal is better than a serving cell's signal by an offset amount. In response to determining that a measurement report trigger has been met, the wireless device may initialized or start a timer, such as a Time to Trigger timer.

In some embodiments, the wireless device may determine whether a Time To Trigger timer exceeds a Time To Trigger threshold in response to determining that a measurement report trigger condition is met, and may initiate the autonomous handover from the current or first base station to the second base station in response to determining that the Time To Trigger timer meets or exceeds the Time To Trigger threshold (or the Time To Trigger timer expires, depending on the timer configuration). In some embodiments, the wireless device may determine whether a Time To Trigger ratio timer exceeds a Time To Trigger ratio threshold in response to determining that a measurement report trigger condition is met. In some embodiments, the wireless device may send to the second base station an indication that the cause of the PDSCH error is an out of coverage condition. In some embodiments, the wireless device may initiate an autonomous handover by sending one or more signals to the second base station to request access to the second base station. In some embodiments, the wireless device may send one or more initial access signals, such as one or more signals of a Random Access (RACH) procedure.

In some embodiments, the indication that the cause of the PDSCH error is the out of coverage condition may enable the second base station to obtain information that reduces the time to reestablish a communication link between the wireless device and the communication network. In some embodiments, the wireless device may be configured by the network to perform the autonomous handover. For example, the wireless device may receive from the base station a control signal that configures the wireless device to perform the autonomous handover.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

Figure 2:
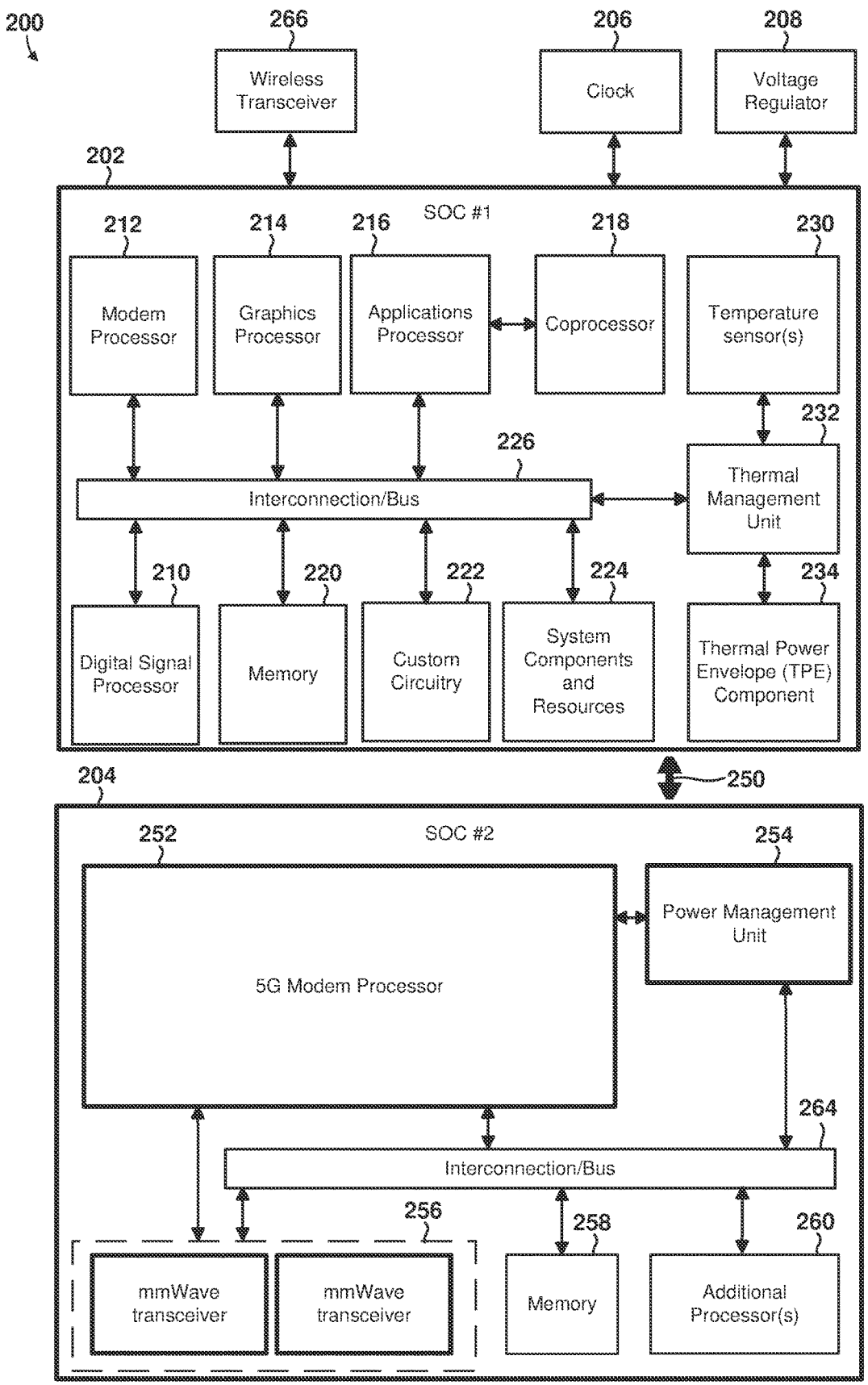
FIG. 2 is a component block diagram illustrating an example computing and wireless modem system suitable for implementing any of the various embodiments.

In some embodiments, two or more mobile devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a wireless device (e.g., 120a-120e) or a base station (e.g., 110a-110d). In some embodiments, the first SOC 202 may operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
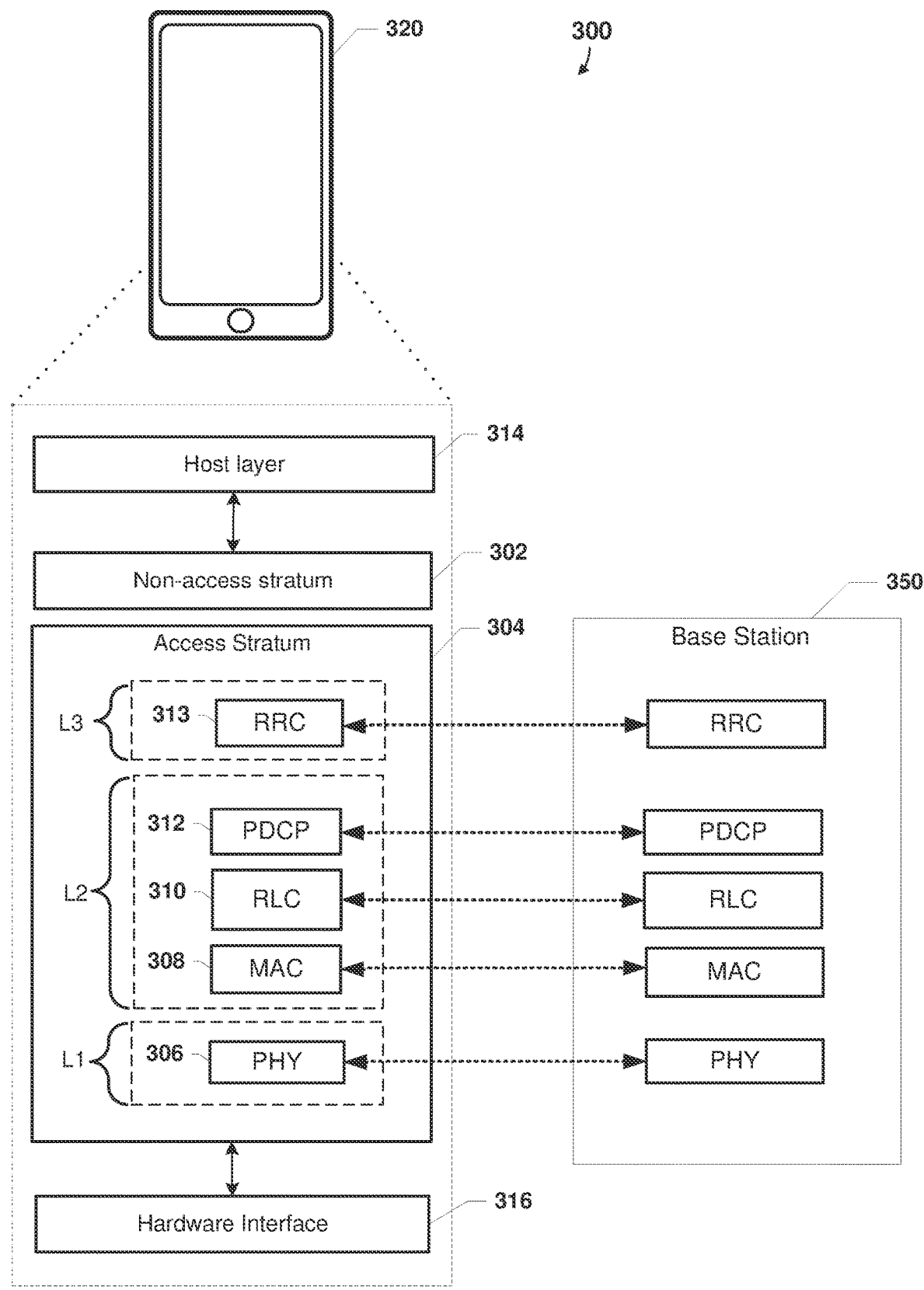
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base stations 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
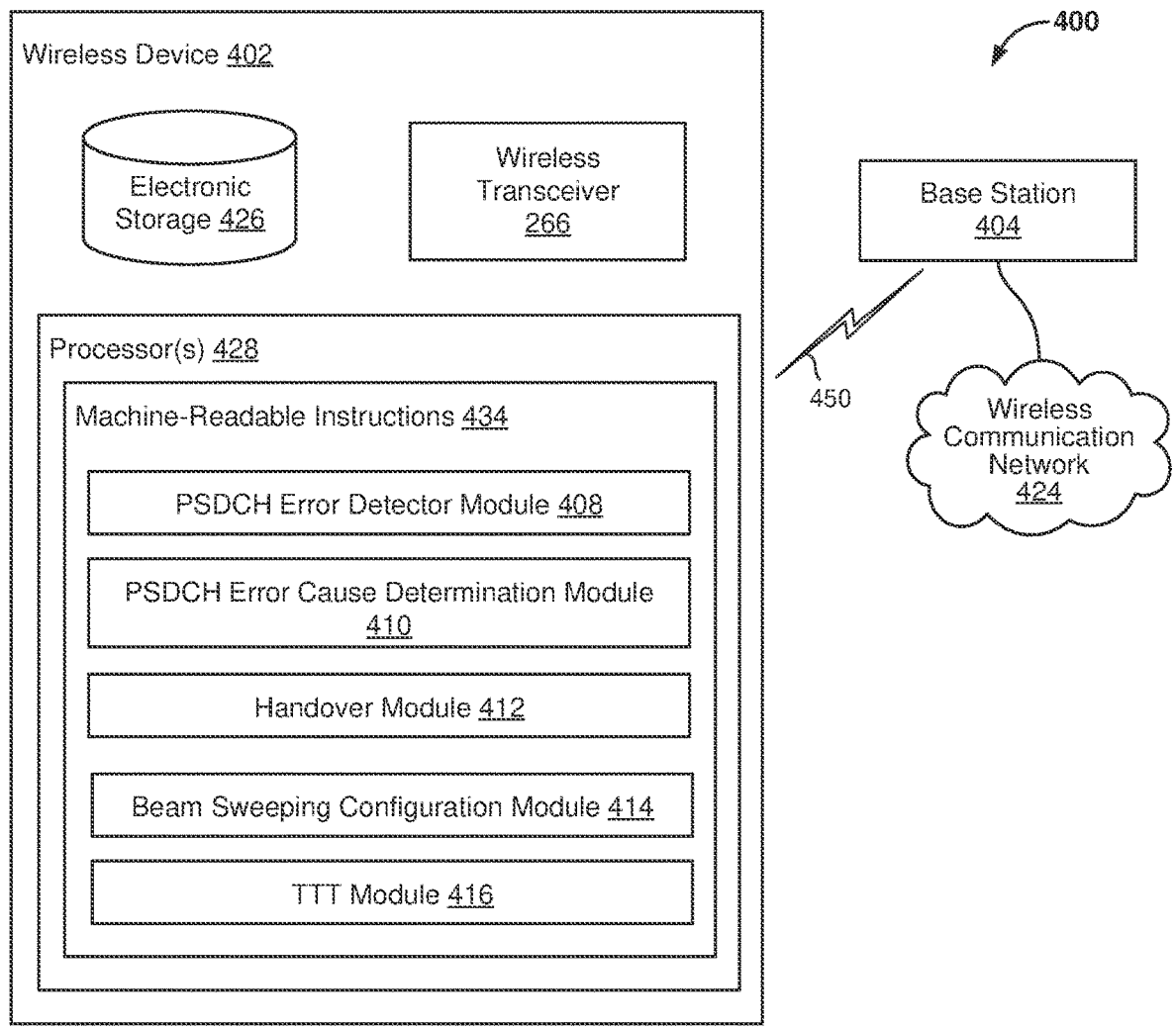
FIG. 4 is a component block diagrams illustrating a system configured for managing a communication link with a communication network in accordance with various embodiments.

FIG. 4 is a component block diagram illustrating a system 400 configured for managing a communication link with a communication network in accordance with various embodiments. With reference to FIGS. 1-4, system 400 may include a wireless device 402 (e.g., 120a-1203d, 200, 320) and a base station 404 (e.g., 110a-110d, 200, 350). The wireless device 402 and the base station 404 may exchange wireless communications in order to establish a wireless communication link 450 (e.g., 122, 124) that may provide the wireless device 402 with access to a wireless communication network 424 (aspects of which are illustrated in FIG. 1).

The wireless device 402 may include one or more processors 428 coupled to electronic storage 426 and a wireless transceiver (e.g., 266). The wireless transceiver 266 may be configured to receive messages to be sent in uplink transmissions from the processor(s) 428, and to transmit such messages via an antenna (not shown) to the base station 404 for eventual relay to the wireless communication network 424. In some embodiments, the base station 404 may receive message from the wireless communication network 424 for relay to the wireless device 402. Similarly, the wireless transceiver 266 may be configured to receive messages from the base station 404 in downlink transmissions and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a PDSCH error detector module 408, a PDSCH error cause determination module 410, a handover module 412, a beam sweeping configuration module 414, a Time To Trigger (TTT) module 416, or other instruction modules.

The PDSCH error detector module 408 may be configured to detect a PDSCH error in a downlink communication from the base station 404.

The PDSCH error cause determination module 410 may be configured to determine whether a cause of a detected PDSCH error in a downlink communication from a base station is an out of coverage condition.

The handover module 412 may be configured to initiate an autonomous handover from the base station to a second base station in response to determining that the cause of the PDSCH error is an out of coverage condition The beam sweeping configuration module 414 may be configured to determine whether the wireless device is configured to perform multi-slot physical uplink control channel (PUCCH) uplink beam sweeping.

The Time To Trigger (TTT) module 416 may be configured to determine whether a Time To Trigger timer exceeds a Time To Trigger threshold in response to determining that an Event A3 condition is met.

The electronic storage 426 may include non-transitory storage media that electronically stores information. The electronic storage media of electronic storage 426 may include one or both of system storage that is provided integrally (i.e., substantially non-removable) with the wireless device 402 or base station 404 and/or removable storage that is removably connectable to the wireless device 402 or base station 404 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428 information received from the wireless device 402 or base station 404, or other information that enables the wireless device 402 or base station 404 to function as described herein.

Processor(s) 428 may be configured to provide information processing capabilities in the base station 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-416 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-416 described below is for illustrative purposes, and is not intended to be limiting, as any of modules 408-416 may provide more or less functionality than is described. For example, one or more of the modules 408-416 may be eliminated, and some or all of its functionality may be provided by other modules 408-416. As another example, the processor(s) 428 may be configured to execute one or more additional modules that may perform some or all of the functionality attributed below to one of the modules 408-416.

Figure 5A:
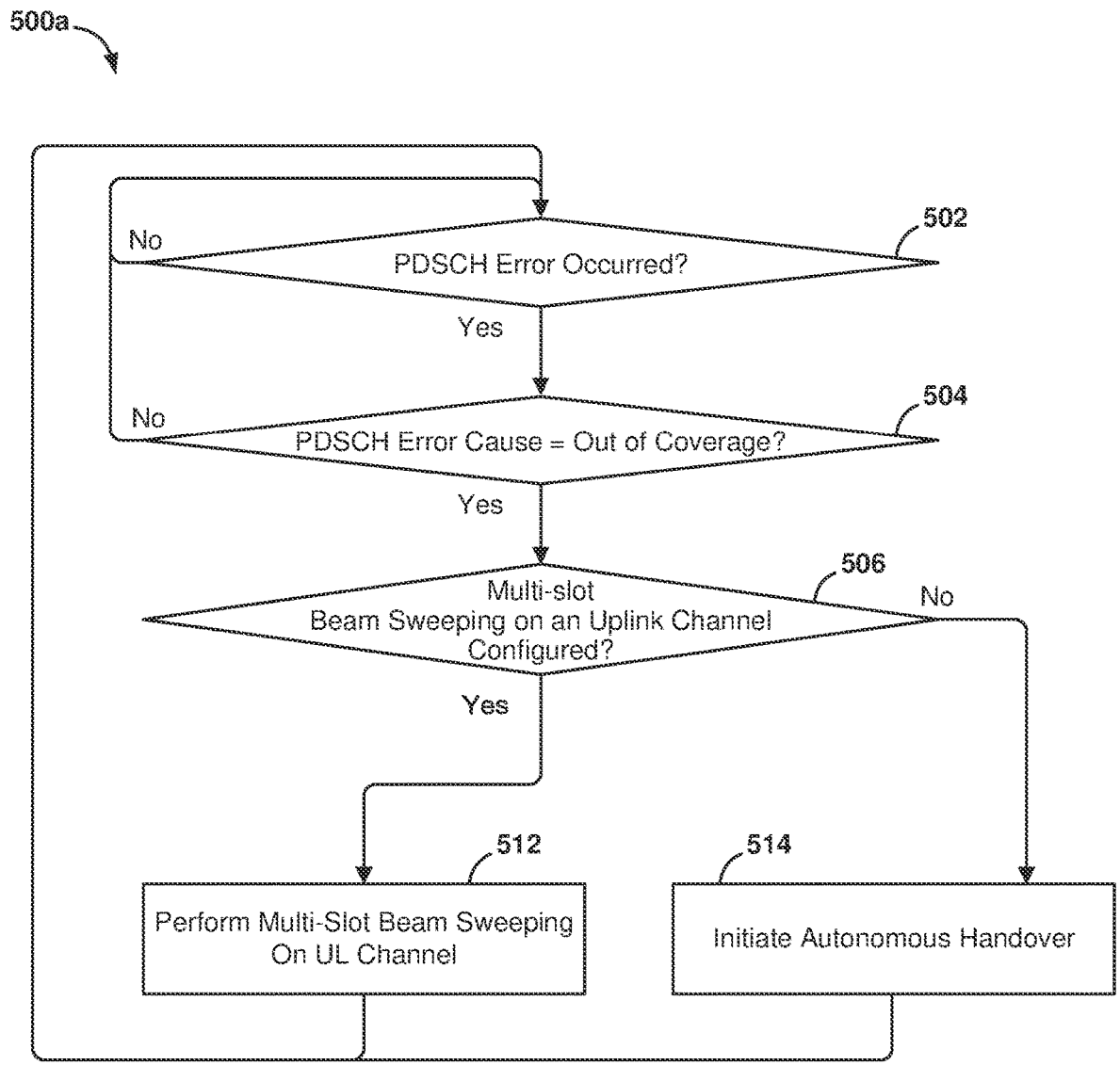
FIG. 5A is a process flow diagram illustrating a method that may be performed by a processor of a wireless device for managing a communication link with a communication network in accordance with various embodiments.

FIG. 5A is a process flow diagram illustrating a method 500*a* that may be performed by a processor of a base station for managing a communication link with a communication network according to various embodiments. With reference to FIGS. 1-5A, the method 500*a* may be implemented by a processor (e.g., 210, 212, 214, 216, 218, 252, 260, 428) of a wireless device (e.g., the wireless device 120*a*-120*e*, 350, 402).

In determination block 502, the processor may determine whether a physical downlink shared channel (PDSCH) error has occurred. In some embodiments, the processor may determine that a downlink signal, such as a control signal or a data signal cannot be decoded to provide useful information to the processor. Means for performing functions of the operations in determination block 502 may include the processor (e.g., 210, 212, 214, 216, 218, 252, 260, 428) and a wireless transceiver (e.g., 266).

In response to determining that a PDSCH error has not occurred (e.g., determination block 502="No"), the processor may again perform the operations of determination block 502.

In response to determining that a PDSCH error has occurred (e.g., determination block 502="Yes"), the processor may determine whether a cause of the detected PDSCH error in a downlink communication from a base station is an out of coverage condition in determination block 504. Means for performing functions of the operations in determination block 504 may include the processor (e.g., 210, 212, 214, 216, 218, 252, 260, 428).

In various embodiments, the processor may determine that the cause of the detected PDSCH error in the downlink communication is an out of coverage condition in determination block 504 based on one or more determinations of signal strength or quality. Examples of an out of coverage condition include the wireless device being in a location with poor or no coverage from a base station (e.g., a "coverage hole"), the wireless device determining that a signal from the base station is substantially degraded or blocked, the wireless device determining that communication of control signaling and/or data signaling with the base station is substantially degraded or blocked, or another similar state or status. In some embodiments, the processor may determine whether a received signal strength that is averaged over a whole system bandwidth (or bandwidth part (BWP)) less an average received signal strength that is averaged over a beam blocking duration (a "beam blocking coherence time") is less than a signal strength threshold. This determination may be represented as $L3\_RSRP_{averageSsytemBandwidth} < L3\_RSRP_{Threshold3}$. In some embodiments, the signal strength threshold may be a receive level sensitivity. In some embodiments, the signal strength threshold may be a receive level sensitivity plus an adjustment or hysteresis (e.g., 0.25 decibels (dBs)) (e.g., $L3\_RSRP_{Threshold3}$=RxSensitivityLevel+0.25 dB).

In some embodiments, the processor may determine in determination block 504 whether a maximum received signal strength (e.g., among resource blocks RBs) less the maximum received signal strength averaged over the beam blocking duration is below a maximum signal strength threshold. This determination may be represented as max $(L3\_RSRP_{ResourceBlock}) < L3\_RSRP_{Threshold4}$. In some embodiments, the signal strength threshold may be a receive level sensitivity. In some embodiments, the signal strength threshold may be a receive level sensitivity plus an adjustment or hysteresis (e.g., 0.5 decibels (dBs)) (e.g., $L3\_RSRP_{Threshold4}$=RxSensitivityLevel+0.5 dB).

In some embodiments, the processor may determine in determination block 504 whether a received signal strength on a number of physical resource blocks (PRBs) (e.g., a specified number of resource blocks, a percentage of resource blocks, or at least a threshold number of resource blocks) averaged over the beam blocking duration is below a signal strength threshold. In some embodiments, this may be represented as $L3\_RSRP_{ResourceBlock} < L3\_RSRP_{Threshold5}$, for X PRBs. In some embodiments, the signal strength threshold may be a receive level sensitivity. In some embodiments, the signal strength threshold may be a receive level sensitivity plus a small adjustment or hysteresis (e.g., 0.25 decibels (dBs)) (e.g., $L3\_RSRP_{Threshold5}$=RxSensitivityLevel+0.25 dB for (e.g.) 75% of PRBs in a bandwidth part (BWP)).

In some embodiments, the processor may determine in determination block 504 whether an instantaneous received signal strength averaged over system bandwidth is below a signal strength threshold. This determination may be represented as $L1\_RSRP_{averageSsytemBandwidth} < L1\_RSRP_{Threshold1}$.

In some embodiments, the processor may determine in determination block 504 whether an instantaneous maximum received signal strength (e.g., among resource blocks RBs) is below a maximum signal strength threshold. This determination may be represented as $\max(L1\_RSRP_{ResourceBlock}) < L1\_RSRP_{Threshold2}$.

In some embodiments, the processor may determine in determination block 504 whether there is a significant drop of instantaneous received signal strength averaged over system bandwidth. This determination may be represented as $L1\_RSRP_{t1} - L1\_RSRP_{t2} < L1\_RSRP\_Drop_{Threshold5}$.

In response to determining that the cause of the detected PDSCH error in a downlink communication from a base station is not an out of coverage condition (i.e., determination block 504="No"), the processor may again perform the operations of determination block 502.

In response to determining that the cause of the detected PDSCH error in a downlink communication from a base station is an out of coverage condition (i.e., determination block 504="Yes"), the processor may determine whether the wireless device is configured to perform multi-slot beam sweeping on an uplink channel (e.g., a PUCCH or PUSCH) in determination block 506. For example, the processor may determine whether a mechanism for improving the communication link with the base station is available to the wireless device. In some embodiments, the processor may determine whether the wireless device has received an indication (such as an RRC message) that one or more uplink beams have been activated or prepared for the wireless device, such that the wireless device could use such uplink beams to communicate with the base station. In some embodiments, the processor may determine whether the wireless device has received a precoding matrix from the base station for one or more uplink beams. Means for performing functions of the operations in determination block 506 may include the processor (e.g., 210, 212, 214, 216, 218, 252, 260, 428).

In response to determining that the wireless device is configured to perform multi-slot beam sweeping on an uplink channel (i.e., determination block 506="Yes"), the processor may perform multi-slot beam sweeping on an uplink channel in block 512. In some embodiments, the processor may perform multi-slot beam sweeping on the uplink channel to attempt to recover the communication or mitigate the determined PDSCH error in block 512. In some embodiments, the processor may transmit one or more non-acknowledgement (NACK) messages (e.g., performing a multi-slot NACK) via the uplink beam sweeping. Means for performing functions of the operations in determination block 512 may include the processor (e.g., 210, 212, 214, 216, 218, 252, 260, 428) and the wireless transceiver 266

In response to determining that the wireless device is not configured to perform multi-slot beam sweeping on an uplink channel (i.e., determination block 506="No"), the processor may initiate an autonomous handover from the base station to a second base station in block 514. In some embodiments, the wireless device may initiate the autonomous handover by sending one or more signals to the second base station to request access to the second base station. In some embodiments, the wireless device may send one or more initial access signals, such as one or more signals of a RACH procedure. Means for performing functions of the operations in determination block 514 may include the processor (e.g., 210, 212, 214, 216, 218, 252, 260, 428) and the wireless transceiver 266

Following the operations of block 512 or 514, the processor may repeat the operations of the method 500a by again performing the operations of determination block 502.

Figure 5B:
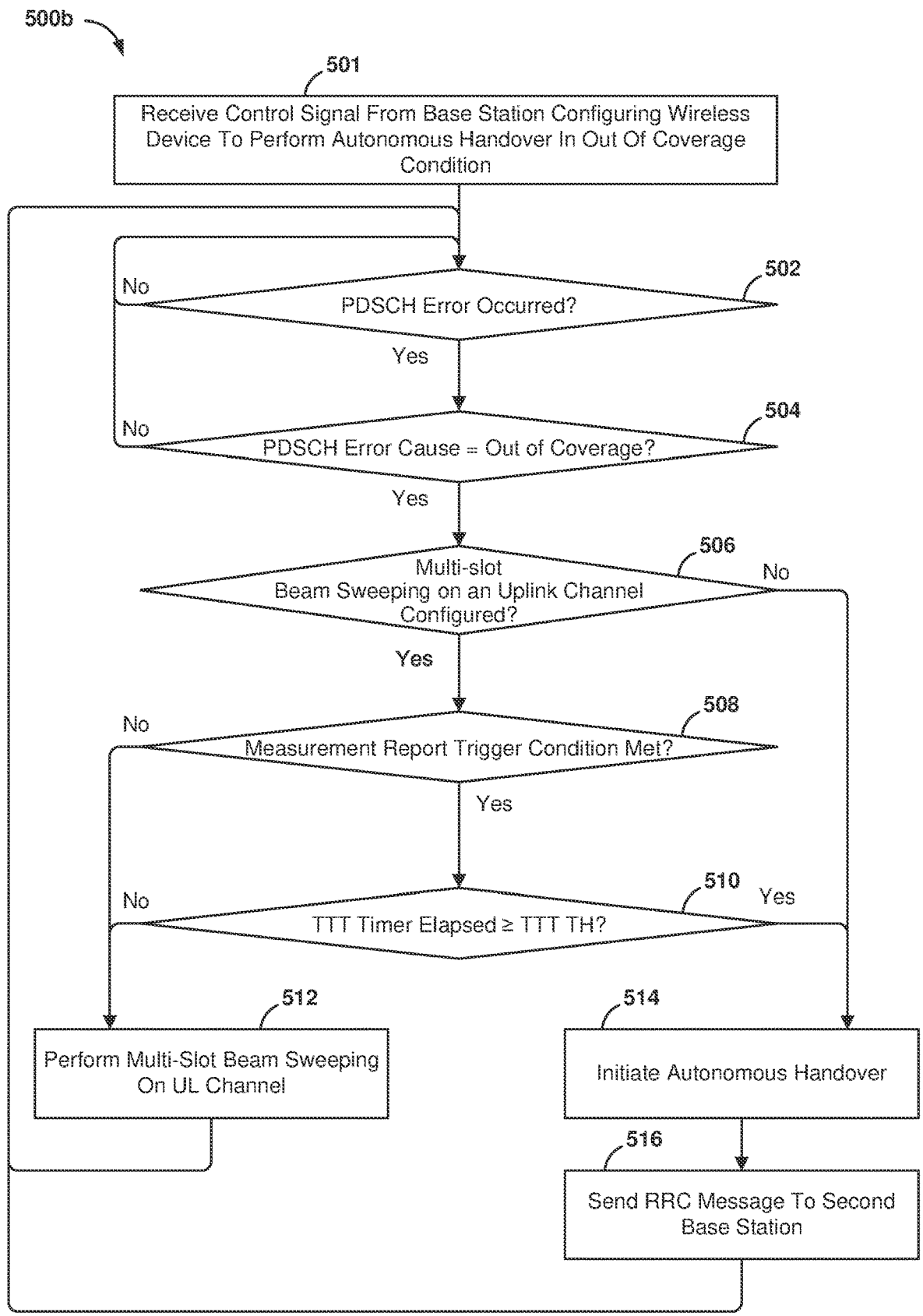
FIG. 5B is a process flow diagram illustrating operations that may be performed as part of the method for managing a communication link with a communication network in accordance with various embodiments.

FIG. 5B is a process flow diagram illustrating operations 500b that may be performed as part of the method 500a for managing a communication link with a communication network according to various embodiments. With reference to FIGS. 1-5B, the operations 500b may be implemented by a processor (e.g., 210, 212, 214, 216, 218, 252, 260, 428) of a wireless device (e.g., the wireless device 120a-120e, 350, 402).

In block 501, the processor may receive from the base station a control signal that configures the wireless device to perform the autonomous handover in the out of coverage condition. In some embodiments, the control signal may include a Radio Resource Configuration (RRC) signal. In some embodiments, the control signal may include an "AutonomousHoPDSCHErrorCauseOutOfCoverage" message that may include one or more configurable parameters, such as a time window (e.g., in 1-800 slots), a number of PDSCH errors in the time window (e.g., 1-8), whether an Event A3-1 must be triggered (e.g., yes or no), an amount of an Event A3 timer (e.g., Time To Trigger) that must elapse (e.g., 5-95%), and/or other configurable values, which may indicate one or more conditions. In some embodiments, in response to determining that such one or more conditions are met, the wireless device may initiate (e.g., attempt to perform) the autonomous handover.

In various embodiments, the processor may perform the operations of determination blocks 502-506 substantially as described.

In response to determining that the wireless device is configured to perform multi-slot physical uplink control channel (PUCCH) uplink beam sweeping (i.e., determination block 506="Yes"), the processor may determine whether a measurement report trigger condition is met in determination block 508. Means for performing functions of the operations in determination block 508 may include the processor (e.g., 210, 212, 214, 216, 218, 252, 260, 428) and the wireless transceiver 266

In some embodiments, the processor may determine in determination block 508 whether a signal from a neighboring base station or cell (e.g., a second base station) is superior to the base station or cell (e.g., the serving base station or cell). In some embodiments, this may be represented by Mneigh+Oneigh,freq+Oneigh, cell−Hyst>Msery+Oserv,freq+Oserv, cell+Offset, in which Mneigh represents signal level or quality of the neighbor cell (RSRP or Reference Signal Receive Quality (RSRQ)), Oneigh, freq represents a frequency-specific offset for the inter-frequency neighboring cell, Oneigh, cell represents a cell individual offset for the intra-frequency neighboring cell, Hyst represents a hysteresis used to avoid ping-pong handover, Msery represents a signal level or quality of the serving cell (RSRP or RSRQ), Oserv, freq represents a frequency-specific offset for the inter-frequency serving cell, Oserv, cell represents a cell specific offset for the serving cell, and Offset represents a value such that the handover is performed when the signal of the neighboring cell is significantly better than that of the serving cell. Means for performing functions of the operations in determination block 508 may include the processor (e.g., 210, 212, 214, 216, 218, 252, 260, 428) and the wireless transceiver 266.

In response to determining that the Event A3 condition is not met (i.e., determination block 508="No"), the processor may perform multi-slot beam sweeping on an uplink channel, e.g., to attempt to recover the communication or mitigate the determined PDSCH error in block 512 as described.

In response to determining that the Event A3 condition is met (i.e., determination block 508="Yes"), the processor may determine whether a Time To Trigger (TTT) timer meets or exceeds a Time To Trigger threshold in determination block 510. In some embodiments, the Time To Trigger threshold may be sent to the wireless device by the base station in an RRC signal (e.g., an "AutonomousHoPDSCHErrorCauseOutOfCoverage" message). Means for performing functions of the operations in determination block 508 may include the processor (e.g., 210, 212, 214, 216, 218, 252, 260, 428) and the wireless transceiver 266

In response to determining that the Time To Trigger timer does not meet or exceed the Time To Trigger threshold (i.e., determination block 510="No"), the processor may perform multi-slot beam sweeping on an uplink channel to attempt to recover the communication or mitigate the determined PDSCH error in block 512 as described.

In response to determining that the Time To Trigger timer meets or exceeds the Time To Trigger threshold (i.e., determination block 510="Yes"), the processor may initiate an autonomous handover from the base station to a second base station in block 514 as described.

In block 516, the processor may send to the second base station an indication that the cause of the PDSCH error, and thus the reason for the autonomous handover, was an out of coverage condition. For example, the processor may send an RRCReestablishmentRequestCause message to the second base station that includes an indicator such as "OutOfCoverage" or another suitable indicator.

Following the operations of block 512 or block 516, the processor may again perform the operations of determination block 502.

Figure 6:
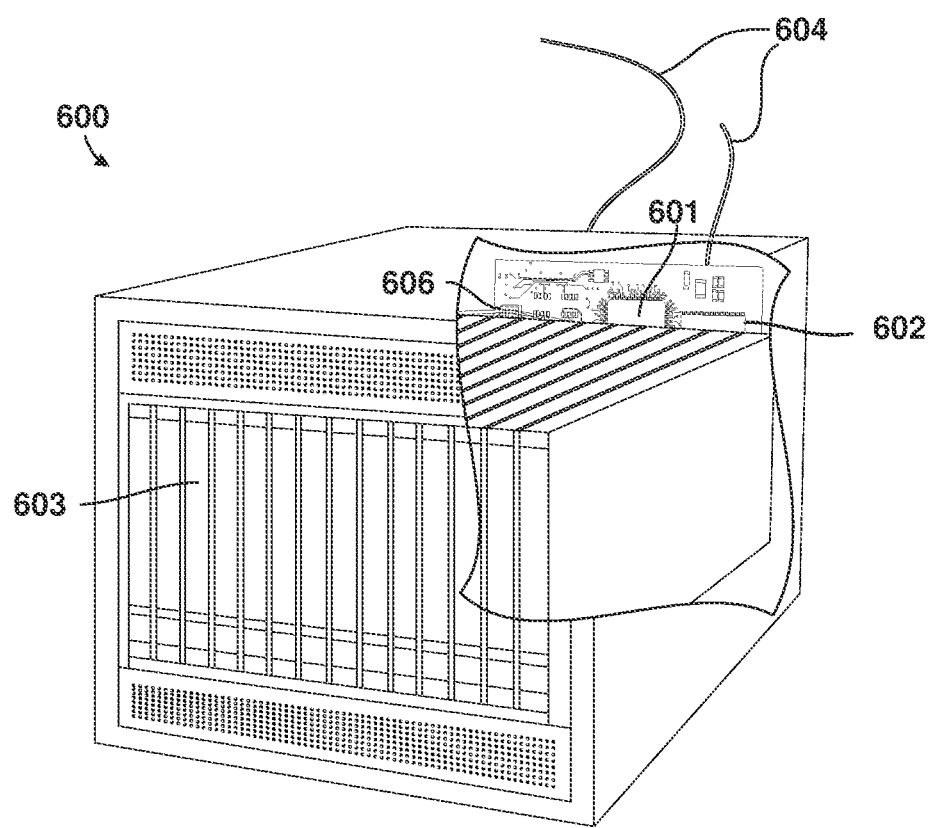
FIG. 6 is a component block diagram of a network computing device suitable for use with various embodiments.

Various embodiments, including the method 500a and the operations 500b, may be performed in a variety of network computing devices (e.g., in a base station), an example of which is illustrated in FIG. 6 that is a component block diagram of a network computing device 600 suitable for use with various embodiments. Such network computing devices may include at least the components illustrated in FIG. 6. With reference to FIGS. 1-6, a network computing device 600 may include a processor 601 coupled to volatile memory 602 (e.g., 426) and a large capacity nonvolatile memory, such as a disk drive 603. The network computing device 600 may also include a peripheral memory access device such as a floppy disc drive, compact disc (CD) or digital video disc (DVD) drive 606 coupled to the processor 601. The network computing device 600 may also include network access ports 604 (or interfaces) coupled to the processor 601 for establishing data connections with a network, such as the Internet and/or a local area network coupled to other system computers and servers. The network computing device 600 may be connected to one or more antennas for sending and receiving electromagnetic radiation that may be connected to a wireless communication link. The network computing device 600 may include additional access ports, such as USB, Firewire, Thunderbolt, and the like for coupling to peripherals, external memory, or other devices.

Figure 7:
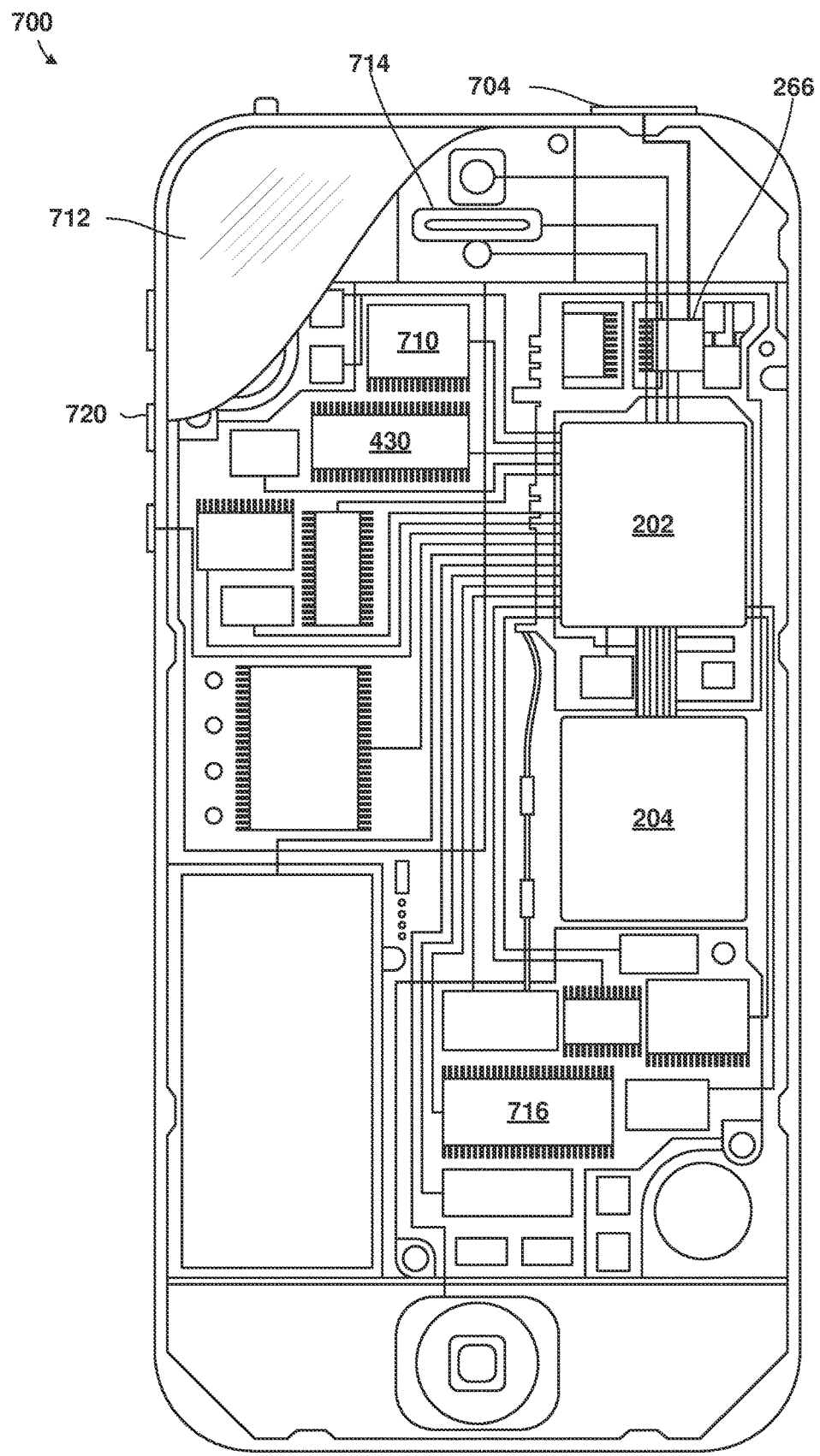
FIG. 7 is a component block diagram of a wireless device suitable for use with various embodiments.

Various embodiments, including the method 500a and the operations 500b, may be performed in a variety of wireless devices (e.g., the wireless device 120a-120e, 200, 320, 402), an example of which is illustrated in FIG. 7 that is a component block diagram of a wireless device 700 suitable for use with various embodiments. With reference to FIGS. 1-7, a wireless device 700 may include a first SOC 202 (e.g., a SOC-CPU) coupled to a second SOC 204 (e.g., a 5G capable SOC). The first and second SOCs 202, 204 may be coupled to internal memory 430, 716, a display 712, and to a speaker 714. Additionally, the wireless device 700 may include an antenna 704 for sending and receiving electromagnetic radiation that may be connected to a wireless data link and/or cellular telephone transceiver 266 coupled to one or more processors in the first and/or second SOCs 202, 204. The wireless device 700 may also include menu selection buttons or rocker switches 720 for receiving user inputs.

The wireless device 700 also may include a sound encoding/decoding (CODEC) circuit 710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 710 may include a digital signal processor (DSP) circuit (not shown separately).

The processors of the network computing device 700 and the wireless device 700 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 426, 430, 716 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 500a and the operations 500b, may be substituted for or combined with one or more operations of the method 500a and the operations 500b.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1

A method performed by a processor of a wireless device for managing a communication link with a communication network, including determining whether a cause of a detected physical downlink shared channel (PDSCH) error in a downlink communication from a base station is an out of coverage condition; and initiating an autonomous handover from the base station to a second base station in response to determining that the cause of the PDSCH error is an out of coverage condition.

Example 2

The method of example 1, in which initiating an autonomous handover from the base station to a second base station in response to determining that the cause of the PDSCH error is an out of coverage condition includes determining whether the wireless device is configured to perform multi-slot beam sweeping on an uplink channel; and initiating the autonomous handover from the base station to the second base station in response to determining that the wireless device is not configured to perform multi-slot beam sweeping on the uplink channel.

Example 3

The method of either of examples 1 or 2, in which determining whether the wireless device is configured to perform multi-slot beam sweeping on the uplink channel includes determining whether the wireless device has received an indication that one or more uplink beams have been activated for the wireless device.

Example 4

The method of either of examples 1 or 2, in which determining whether the wireless device is configured to perform multi-slot beam sweeping on the uplink channel includes determining whether the wireless device has received a precoding matrix from the base station for one or more uplink beams.

Example 5

The method of either of examples 1 or 2, further including determining whether a Time To Trigger timer exceeds a Time To Trigger threshold in response to determining that an Event A3 condition is met; and initiating the autonomous handover from the base station to the second base station in response to determining that the Time To Trigger timer exceeds the Time To Trigger threshold.

Example 6

The method of any of examples 1-5, in which initiating an autonomous handover from the base station to a second base station in response to determining that the cause of the PDSCH error is an out of coverage condition includes sending to the second base station an indication that the cause of the PDSCH error is the out of coverage condition.

Example 7

The method of any of examples 1-6, further including receiving from the base station a control signal that configures the wireless device to perform the autonomous handover in the out of coverage condition.

Example 8

The method of any of examples 1-7, in which initiating an autonomous handover from the base station to a second base station in response to determining that the cause of the PDSCH error is an out of coverage condition includes sending an initial access signal to the second base station.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing a communication link with a communication network, comprising:
   determining whether a cause of a detected physical downlink shared channel (PDSCH) error in a downlink communication from a base station is an out of coverage condition; and
   initiating an autonomous handover from the base station to a second base station in response to determining that the cause of the PDSCH error is an out of coverage condition.

2. The method of claim 1, wherein initiating an autonomous handover from the base station to a second base station in response to determining that the cause of the PDSCH error is an out of coverage condition comprises:
   determining whether the wireless device is configured to perform multi-slot beam sweeping on an uplink channel; and
   initiating the autonomous handover from the base station to the second base station in response to determining that the wireless device is not configured to perform multi-slot beam sweeping on the uplink channel.

3. The method of claim 2, wherein determining whether the wireless device is configured to perform multi-slot beam sweeping on the uplink channel comprises determining whether the wireless device has received an indication that one or more uplink beams have been activated for the wireless device.

4. The method of claim 2, wherein determining whether the wireless device is configured to perform multi-slot beam sweeping on the uplink channel comprises determining whether the wireless device has received a precoding matrix from the base station for one or more uplink beams.

5. The method of claim 2, further comprising:
   determining whether a Time To Trigger timer exceeds a Time To Trigger threshold in response to determining that a measurement report trigger condition is met; and
   initiating the autonomous handover from the base station to the second base station in response to determining that the Time To Trigger timer exceeds the Time To Trigger threshold.

6. The method of claim 1, wherein initiating an autonomous handover from the base station to a second base station in response to determining that the cause of the PDSCH error is an out of coverage condition comprises sending to the second base station an indication that the cause of the PDSCH error is the out of coverage condition.

7. The method of claim 1, further comprising receiving from the base station a control signal that configures the wireless device to perform the autonomous handover in the out of coverage condition.

8. The method of claim 1, wherein initiating an autonomous handover from the base station to a second base station in response to determining that the cause of the PDSCH error is an out of coverage condition comprises sending an initial access signal to the second base station.

9. A wireless device, comprising:
a processor configured with processor executable instructions to perform operations comprising:
determining whether a cause of a detected physical downlink shared channel (PDSCH) error in a downlink communication from a base station is an out of coverage condition; and
initiating an autonomous handover from the base station to a second base station in response to determining that the cause of the PDSCH error is an out of coverage condition.

10. The wireless device of claim 9, wherein the processor is further configured with processor executable instructions to perform operations such that initiating an autonomous handover from the base station to a second base station in response to determining that the cause of the PDSCH error is an out of coverage condition comprises:
determining whether the wireless device is configured to perform multi-slot beam sweeping on an uplink channel; and
initiating the autonomous handover from the base station to the second base station in response to determining that the wireless device is not configured to perform multi-slot beam sweeping on the uplink channel.

11. The wireless device of claim 10, wherein the processor is further configured with processor executable instructions to perform operations such that determining whether the wireless device is configured to perform multi-slot beam sweeping on the uplink channel comprises determining whether the wireless device has received an indication that one or more uplink beams have been activated for the wireless device.

12. The wireless device of claim 10, wherein the processor is further configured with processor executable instructions to perform operations such that determining whether the wireless device is configured to perform multi-slot beam sweeping on the uplink channel comprises determining whether the wireless device has received a precoding matrix from the base station for one or more uplink beams.

13. The wireless device of claim 10, wherein the processor is further configured with processor executable instructions to perform operations comprising:
determining whether a Time To Trigger timer exceeds a Time To Trigger threshold in response to determining that a measurement report trigger condition is met; and
initiating the autonomous handover from the base station to the second base station in response to determining that the Time To Trigger timer meets or exceeds the Time To Trigger threshold.

14. The wireless device of claim 9, wherein the processor is further configured with processor executable instructions to perform operations such that initiating an autonomous handover from the base station to a second base station in response to determining that the cause of the PDSCH error is an out of coverage condition comprises sending to the second base station an indication that the cause of the PDSCH error is the out of coverage condition.

15. The wireless device of claim 9, wherein the processor is further configured with processor executable instructions to perform operations further comprising receiving from the base station a control signal that configures the wireless device to perform the autonomous handover in the out of coverage condition.

16. The wireless device of claim 9, wherein the processor is further configured with processor executable instructions to send an initial access signal to the second base station in response to determining that the cause of the PDSCH error is an out of coverage condition.

17. A non-transitory processor-readable medium having stored thereon processor-executable instruction configured to cause a processing device in a wireless device to perform operations comprising:
determining whether a cause of a detected physical downlink shared channel (PDSCH) error in a downlink communication from a base station is an out of coverage condition; and
initiating an autonomous handover from the base station to a second base station in response to determining that the cause of the PDSCH error is an out of coverage condition.

18. The non-transitory processor-readable medium of claim 17, wherein the stored processor-executable instructions are configured to cause a processor of a wireless device to perform operations such that initiating an autonomous handover from the base station to a second base station in response to determining that the cause of the PDSCH error is an out of coverage condition comprises:
determining whether the wireless device is configured to perform multi-slot beam sweeping on an uplink channel; and
initiating the autonomous handover from the base station to the second base station in response to determining that the wireless device is not configured to perform multi-slot beam sweeping on the uplink channel.

19. The non-transitory processor-readable medium of claim 18, wherein the stored processor-executable instructions are configured to cause a processor of a wireless device to perform operations such that determining whether the wireless device is configured to perform multi-slot beam sweeping on the uplink channel comprises determining whether the wireless device has received an indication that one or more uplink beams have been activated for the wireless device.

20. The non-transitory processor-readable medium of claim 18, wherein the stored processor-executable instructions are configured to cause a processor of a wireless device to perform operations such that determining whether the wireless device is configured to perform multi-slot beam sweeping on the uplink channel comprises determining whether the wireless device has received a precoding matrix from the base station for one or more uplink beams.

21. The non-transitory processor-readable medium of claim 18, wherein the stored processor-executable instructions are configured to cause a processor of a wireless device to perform operations further comprising:
determining whether a Time To Trigger timer exceeds a Time To Trigger threshold in response to determining that a measurement report trigger condition is met; and
initiating the autonomous handover from the base station to the second base station in response to determining that the Time To Trigger timer exceeds the Time To Trigger threshold.

22. The non-transitory processor-readable medium of claim 17, wherein the stored processor-executable instructions are configured to cause a processor of a wireless device to perform operations such that initiating an autonomous handover from the base station to a second base station in response to determining that the cause of the PDSCH error is an out of coverage condition comprises sending to the second base station an indication that the cause of the PDSCH error is the out of coverage condition.

23. The non-transitory processor-readable medium of claim 17, wherein the stored processor-executable instructions are configured to cause a processor of a wireless device to perform operations further comprising receiving from the base station a control signal that configures the wireless device to perform the autonomous handover in the out of coverage condition.

24. A wireless device, comprising:
    means for determining whether a cause of a detected physical downlink shared channel (PDSCH) error in a downlink communication from a base station is an out of coverage condition; and
    means for initiating an autonomous handover from the base station to a second base station in response to determining that the cause of the PDSCH error is an out of coverage condition.

25. The wireless device of claim 24, wherein means for initiating an autonomous handover from the base station to a second base station in response to determining that the cause of the PDSCH error is an out of coverage condition comprises:
    means for determining whether the wireless device is configured to perform multi-slot beam sweeping on an uplink channel; and
    means for initiating the autonomous handover from the base station to the second base station in response to determining that the wireless device is not configured to perform multi-slot beam sweeping on the uplink channel.

26. The wireless device of claim 25, wherein means for determining whether the wireless device is configured to perform multi-slot beam sweeping on the uplink channel comprises means for determining whether the wireless device has received an indication that one or more uplink beams have been activated for the wireless device.

27. The wireless device of claim 25, wherein means for determining whether the wireless device is configured to perform multi-slot beam sweeping on the uplink channel comprises means for determining whether the wireless device has received a precoding matrix from the base station for one or more uplink beams.

28. The wireless device of claim 25, further comprising:
    means for determining whether a Time To Trigger timer exceeds a Time To Trigger threshold in response to determining that a measurement report trigger condition is met; and
    means for initiating the autonomous handover from the base station to the second base station in response to determining that the Time To Trigger timer exceeds the Time To Trigger threshold.

29. The wireless device of claim 24, wherein means for initiating an autonomous handover from the base station to a second base station in response to determining that the cause of the PDSCH error is an out of coverage condition comprises means for sending to the second base station an indication that the cause of the PDSCH error is the out of coverage condition.

30. The wireless device of claim 24, further comprising means for receiving from the base station a control signal that configures the wireless device to perform the autonomous handover in the out of coverage condition.

* * * * *